United States Patent [19]

Williams

[11] Patent Number: 5,791,810
[45] Date of Patent: Aug. 11, 1998

[54] CONNECTING APPARATUS

[76] Inventor: Douglas Williams, 2300 Scott Rd., Northbrook, Ill. 60062

[21] Appl. No.: 861,715

[22] Filed: May 22, 1997

Related U.S. Application Data

[63] Continuation of Ser. No. 531,663, Sep. 21, 1995, abandoned.
[51] Int. Cl.$^6$ ............................................. B25G 3/02
[52] U.S. Cl. ......................... 403/364; 403/334; 403/339; 403/364; 403/382; 52/489; 24/576; 24/587
[58] Field of Search ............................. 403/230, 231, 403/289, 334, 339, 354, 364, 382; 52/489, 495; 24/576, 587, 401, DIG. 22

[56] References Cited

U.S. PATENT DOCUMENTS

| | | | |
|---|---|---|---|
| 2,914,936 | 12/1959 | Reinold | 24/576 X |
| 3,204,300 | 9/1965 | Hofmann | 403/364 X |
| 3,253,842 | 5/1966 | Rabe | 403/364 X |
| 3,274,624 | 9/1966 | Noerdinger | 24/576 X |
| 3,557,413 | 1/1971 | Engle | 24/576 |
| 4,325,044 | 4/1982 | Ehrgott et al. | 403/354 X |
| 4,429,438 | 2/1984 | Takeshima et al. | 24/401 |
| 4,691,373 | 9/1987 | Ausnit | 24/576 X |
| 4,731,911 | 3/1988 | Gould | 24/576 X |
| 5,114,265 | 5/1992 | Grisley | 403/382 X |
| 5,351,369 | 10/1994 | Swain | 24/576 X |
| 5,357,728 | 10/1994 | Duncanson | 403/382 X |
| 5,588,187 | 12/1996 | Swain | 24/576 X |
| 5,611,185 | 3/1997 | Wilz | 52/489.2 X |
| 5,644,878 | 7/1997 | Wehrmann | 52/489.2 X |

FOREIGN PATENT DOCUMENTS

| | | | |
|---|---|---|---|
| 1176188 | 4/1959 | France | 24/576 |
| 1112446 | 8/1961 | Germany | 24/576 |
| 477940 | 12/1953 | Italy | 24/576 |
| 1624218 | 1/1991 | U.S.S.R. | 403/364 |
| 943668 | 12/1963 | United Kingdom | 24/576 |

*Primary Examiner*—Kenneth J. Dorner
*Assistant Examiner*—Bruce A. Lev

[57] ABSTRACT

A panel connecting device consists of a first member having a base, at least two successive extending elements extending from the base, each of the elements having a thinner portion near the base and a thicker portion at the end of the element. In between the thinner portion and the thicker portion may be an flange portion which gradually widens in the direction of the thicker portion. Thus, a cavity is formed between adjacent extending elements. The cavity is dimensioned to receive an element the size of the extending elements. The panel connecting device also consists of a second member that is substantially similar to the first member. The second member interacts with the first member such that a connection is formed by sliding at least one of the extending elements of the first member into at least one of the cavities between the extending elements of the second member and reciprocally sliding at least one of the extending elements of the second member into at least one of the cavities between the extending elements of the first member. The connection is maintained by mating the thicker portion of the extending elements of the first member with the thinner portion of the extending elements of the second member and mating the thicker portion of the extending elements of the second member with the thinner portion of the extending elements of the first member. The panel connecting device forms a reusable joint to support an external load of panel-type material.

15 Claims, 2 Drawing Sheets

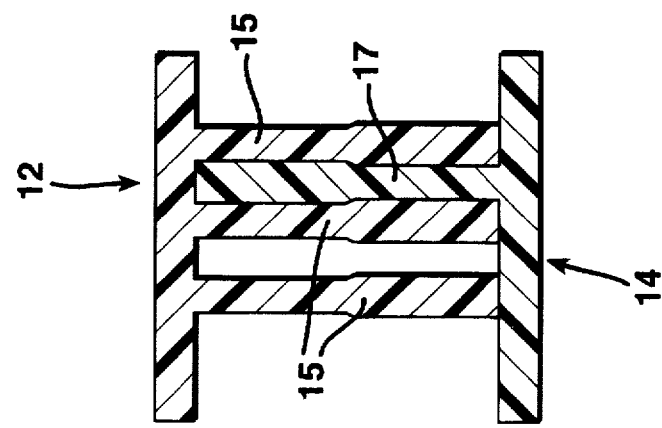
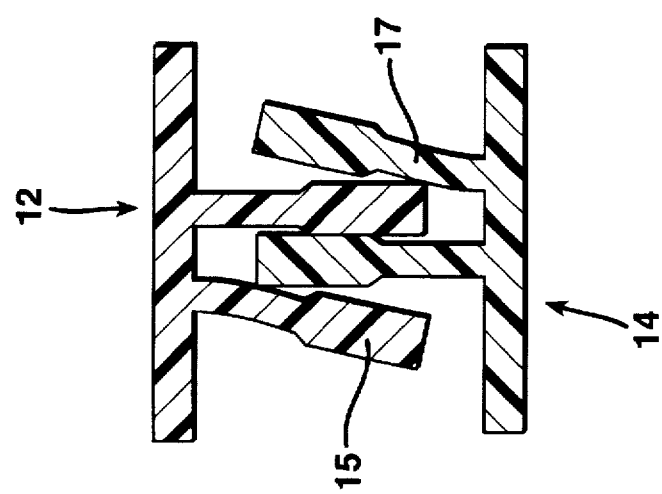
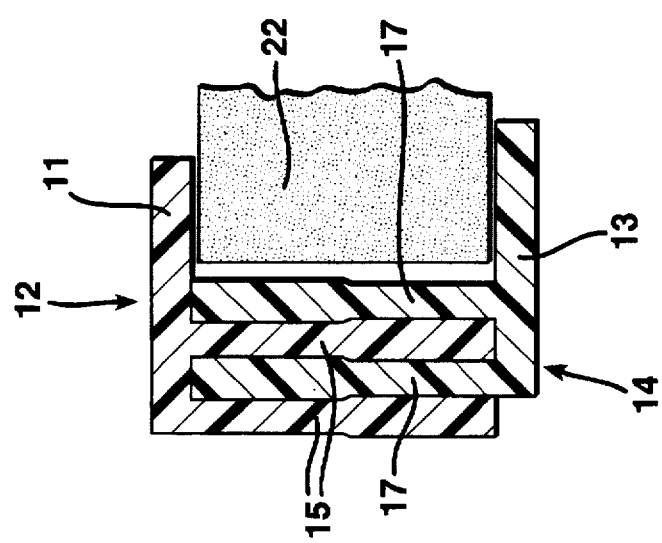

ically, due to the shape of the extending elements 17, resulting in a cavity 6 similar to the cavity 5 of the top member 12. As shown in FIG. 1, the thicker portion 21 preferably has its widest point at the end of the extending element 17. Similarly, the extending element 15 of the top member 12 has its widest point at the end.

1

CONNECTING APPARATUS

This is a continuation of Ser. No. 08/531,663 filed 1995 Sep. 21 abandoned.

This invention relates to panel connectors, fasteners or joints made of a variety of materials and which are capable of providing support for varying loads.

BACKGROUND OF THE INVENTION

There are many different devices that connect, fasten or join two parts or members together to support a panel or similar load. These devices generally have distinctive features that are particular to their application. In most cases, a connector, fastener or joint consists of "male" and "female" members, or a variation thereof. These members are usually dissimilar in detail and designed for specific applications and loads. The following examples are illustrative.

U.S. Pat. No. 4,720,946, issued to Pagliarello, U.S. Pat. No. 3,857,216, issued to Sherman, U.S. Pat. No. 3,263,388, issued to Bogert and U.S. Pat. No. 2,059,483, issued to Parsons relate to dropped or suspended ceilings. Pagliarello discloses a grid clip holder installed externally to a ceiling in which a T-clip (female member) is situated such that a T-member (male member) can be inserted into the T-clip for installing drop ceiling tiles close to the ceiling. Parsons discloses a similar device where a modified T-bar female member accepts two bracket clips and a fastening device, which together constitute a male member. Sherman discloses a ceiling suspension system comprising a top element (male) and a bottom element (female), both of which have teeth which engage when brought together. Bogert discloses a similar ceiling tile hanger installation where the top element is female and the bottom element is male.

U.S. Pat. No. 3,251,168, issued to Waring et al., describes an exterior wall covering support including dissimilar snap-lock coupling elements made of metal. U.S. U.S. Pat. No. 2,998,112, issued to Burgin, discloses a means for removably securing in place an inner lining of a demountable building structure in which the retaining means is a female element and the ceiling supporting member is a male element.

All of the above examples are suited for their particular application and consist of dissimilar members (i.e. male and female) which require different manufacturing processes or equipment. They do not disclose a panel connector that is achieved with similar or identical members that may be used for a variety of applications and loads. Also, they do not disclose one which can be manufactured from a variety of materials.

SUMMARY OF THE INVENTION

The present invention overcomes the prior art limitations by providing a panel connecting device with two, preferably identical, mating members, rather than two dissimilar members.

Another object of the present invention is to provide a connecting apparatus which can be manufactured in a wide variety of materials, depending on the application.

An additional object of the present invention is to provide connecting members that can be easily engaged and disengaged.

Another object of the present invention is to provide connecting members that support variable loads, depending on the precise details of manufacture.

BRIEF DESCRIPTION OF THE DRAWING

Further objects, features and advantages of the invention will become apparent from the following detailed description taken in conjunction with the accompanying figures in which:

2

Figure 2:
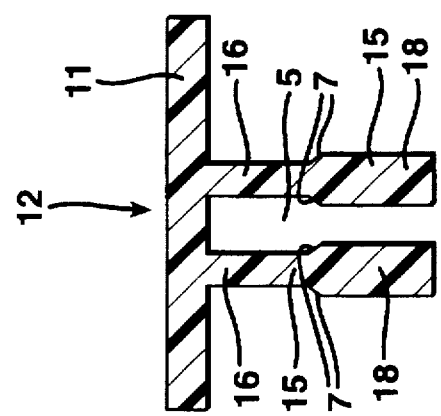
Figure 1:
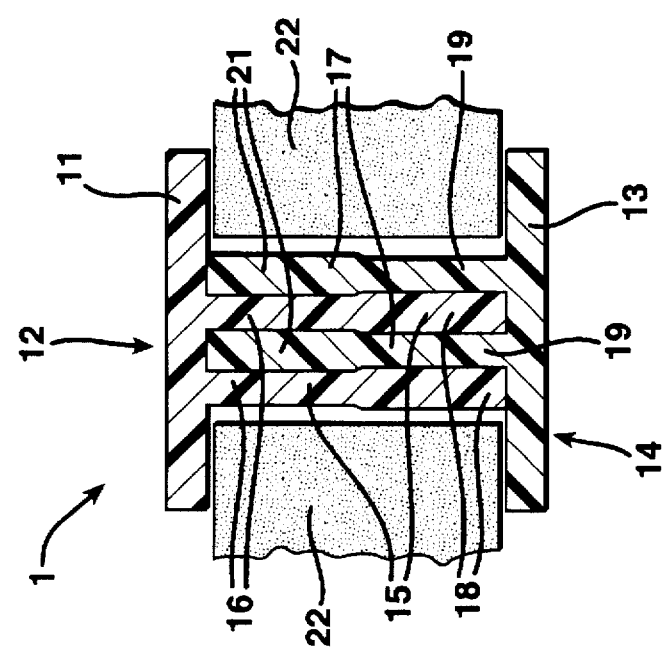

FIG. 1 is a cross-sectional view of the panel connecting device carrying a load of panel-type material in accordance with a preferred embodiment of the invention;

FIG. 2 is a cross-sectional view of the top member of the panel connecting device depicted in FIG. 1.

Figure 3:
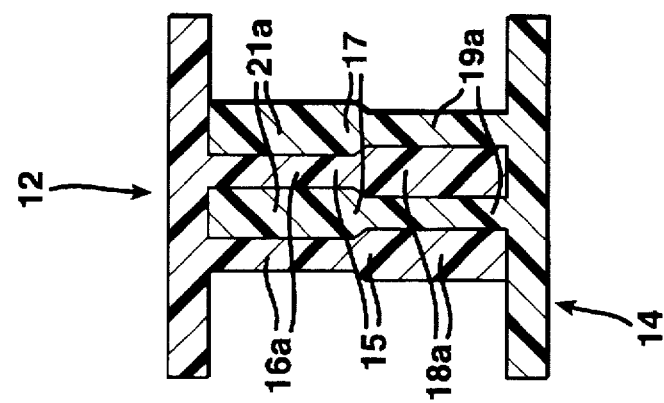

FIG. 3 is a cross-sectional view of a second preferred embodiment of the panel connecting device showing different widths of the mating elements, providing greater load capability;

FIG. 4 is a cross-sectional view of a fourth embodiment of the panel connecting device used as a corner connection.

FIG. 5 is a cross-sectional view of the invention depicted in FIG. 1 in the process of engagement or disengagement; and FIG. 6 is a cross-sectional view of an embodiment of the panel connecting device where the bottom member has a single extending element.

Throughout the figures, the same reference numerals and characters, unless otherwise stated, are used to denote like features, elements, components or portions of the illustrated embodiment. The subject invention will now be described in detail with reference to the figures in connection with preferred embodiments. It is intended that changes and modifications can be made to the described embodiments without departing from the true scope and spirit of the subject invention as defined by the appended claims.

DETAILED DESCRIPTION

In FIG. 1, a preferred embodiment of the panel connecting device 1 is shown in its joined position supporting an external load 22 of panel-type material. The connection is carried out by bringing together a top member 12 and a, preferably identical, bottom member 14. FIG. 5 shows, schematically, the top member 12 and the bottom member 14 in the process of engagement or disengagement.

In FIG. 1, the top member 12 consists of a base 11 and two, preferably identical, downwardly extending elements 15, each of which extend in substantially the same direction, preferably perpendicular to the base 11. More than two extending elements may be used. FIG. 2 shows the top member 12 of FIG. 1 isolated from the bottom member 14. Each extending element 15 has a thinner portion 16 adjacent to the base 11 and a thicker portion 18 toward the end of the element. Thus, a cavity 5 is formed between successive extending elements 15. While the cavity 5 may gradually narrow from the base to the end of the extending elements 15, preferably, flange portions 7 delineate the two portions of each element 15. Thus, due to the shape of the extending elements 15, each cavity 5 is, preferably, wider toward the base 11 of the top member 12 than it is toward the end of the extending elements 15 with a gradual narrowing at the transitional flange portion area in the direction from the base. This configuration permits simple engagement and disengagement of similar members as shown schematically in FIG. 5. The flange portions 7 may be formed at an angle of up to 90 degrees with the sides of the thinner portion 16. As the angle increases, the connecting apparatus can support greater load and is more difficult to disengage relative to the flexibility of the material used to form the members.

Referring back to FIG. 1, similar to the top member 12, the bottom member 14 consists of a base 13 and a, preferably equal, number of upwardly extending elements 17 each of which extend in substantially the same direction, preferably perpendicular to the base 13. Each extending element 17 has a thinner portion 19 and thicker portion 21, which are shown separated by flange portions 7. The extending elements 17, which are substantially similar in dimension to the extending elements 15, form at least one cavity in the same manner as described above. Thus, the cavities of the top member are dimensioned to receive the extending elements from the bottom member and the cavities of the bottom member are dimensioned to receive the extending elements from the top member.

The connection of the apparatus is achieved when the top member 12 and the bottom member 14 come together with at least one of their extending elements, 15 and 17, respectively, aligned to enter and engage the cavities formed by the opposing member. At least one of the extending elements 15 of the top member 12 slides into at least on of the cavities of the bottom member 14 while at least one of the extending elements 17 of the bottom member 14 reciprocally slides into at least one of the cavities of the top member 12. The other extending elements of each member lie firmly adjacent to the extending elements of the opposing member.

The two mating members mate with a slight bending of the extending elements 15 and 17 during engagement (FIG. 5). The connection is secured and completed when the extending elements, 15 and 17, snap into place either within the cavity or adjacent to the extending element of the opposing member. Preferably, this occurs as the flange portions 7 between the thinner portions and the thicker portions of the extending elements come into contact and the thinner portions completely abut the adjacent thicker portions of the opposing member. This so-called "edge effect" caused by the difference of thickness along the adjacent extending elements 15 and 17 and the flange portions 7 keeps the connection in place.

Disengagement occurs when the two members are separated from each other. A smaller angle of the flange portions 7 promotes the thicker portions of each element to be pulled away from their connected positions near the member's base when sufficient force is applied such that the elements 15 and 17 bend or give. Separation and disengagement is complete when the thicker portion of each extending element is pulled completely away and out of the cavity 5.

The members of the present invention can be manufactured in a wide variety of materials including, but not limited to, wood, plastic, metal, concrete, paper, rubber, and other fibrous composites, depending on the application. The limiting factor is flexibility or bendability required for the application. For example, concrete can have sufficient flexibility for large construction applications, while metal and plastic can be used for hung ceiling or wall panel applications.

The present invention's method of disengagement would facilitate applications such as removing or replacing a suspending ceiling panel.

In addition to the angle of the flange portions, load capacity is also determined by the relationship between the flexibility of the material and the resistance to engagement (and disengagement) created by the difference in thickness between the thinner portions and thicker portions of the elements. In general, the more flexible the material, the less the load which can be handled. However, a greater difference in thickness between the element portions can compensate for a more flexible material.

FIG. 3 shows another preferred embodiment of the present invention. In this embodiment, the difference in thickness between the thinner portions, 16a and 19a, and the thicker portions, 18a and 21a, of elements, 15 and 17, respectively, is greater than in FIG. 1. In this embodiment, the panel connecting device is capable of handling a heavier load because a greater force is required to disengage the members. As mentioned above, the flange portion angle could also be increased to improve load capacity.

FIG. 4 illustrates a fourth embodiment of the present invention. In this embodiment, the bases 11 and 13 of the top and bottom members 12 and 14, respectively, extend in one direction away from their respective elements 15 and 17, preferably perpendicular to these elements. As a result, a connection is formed into a corner piece supporting a load 22 of panel-type material.

While the majority of this invention's applications would call for members with at least two elements, some may require the use of a single element member in conjunction with a multiple element member. FIG. 6 illustrates such an embodiment. In FIG. 6, the top member 12 has three extending elements 15 while the bottom member 14 has a single extending element 17. This configuration provides for simple variable positioning of the connector along the base of the multiple element member. Therefore, applications which require flexibility in positioning of the point of connection will benefit from this embodiment.

It can be seen from the present invention that advantages exist over the prior art. First, because the members can be substantially similar, and preferably identical, manufacture will be easier and less costly than those with dissimilar elements. Second, the invention can be used in a variety of applications due to its simple operation of engagement and disengagement. Third, the connection achieved by this invention has excellent sealing ability such that it may be used in applications requiring leak-resistant joints. The leak resistance of this connecting apparatus is created by the relative length of the members and the fact that, in most cases, pressure on either or both sides of the connection will push the mating elements more tightly together. Where the extending elements of the top and bottom members are of identical dimensions, leak resistance is further enhanced by ensuring that no gaps exist. Finally, variations in load capacity may be achieved by slight differences in the invention's manufacture.

The foregoing represents preferred embodiments of the invention. Variations and modifications in the structures shown and described will be apparent to persons skilled in the art, without departing from the inventive concepts disclosed herein. For example, the extending elements as shown in the figures may be made shorter or longer, thicker or thinner, as long as the portions closest to the members' bases are thinner than those toward the ends of the elements in order to maintain the connection. Additionally, the number of extending elements may be increased to three or more to accommodate additional load or sealing requirements. Further, the number of elements may actually differ between each member. Thus, one member may have two elements and the other three, one may have three and the other four, etc. This adds the advantage of variable positioning along the base of one of the members.

Other modifications of the invention will be apparent to those skilled in the art and it is intended that the scope of the invention be limited only as set forth in the appended claims.

I claim:

1. A panel and connector combination with the connectors flexibly forming a reusable joint to support two panels, comprising:

first and second panels, each of said panels having an edge, first and second connecting members, each of said members having a base and a plurality of substantially parallel extending elements projecting from said base; said extending elements of said first member being substantially similar to said extending elements of said second member, each of said extending elements having sidewalls which define an upper portion proximal to said base and a lower portion distal from said base, said upper portion being narrower than said lower portion and separated by flange portions formed at an angle of greater than 90 degrees from said sidewalls, said extending elements being spaced apart such that said side walls of each adjacent extending element define a cavity portion substantially similar in configuration to said extending elements, said extending elements of said second member being capable of slidable and removable insertion into the cavity portion of said first member and said extending elements of said first member being capable of slidable and removable insertion into said cavity portion of said second member along a common plane formed by said extending elements, such that when said joint is formed, said edges of said panels are supported by said connecting members.

2. The panel and connector combination of claim 1 wherein said extending elements of said first member are identical to said extending elements of said second member.

3. The panel and connector combination of claim 1 wherein each cavity has dimensions identical to each extending element such that when said joint is formed, there is no clearance between said extending elements of said first and second members, thereby forming a leak-resistant seal.

4. The panel and connector combination of claim 1 wherein said second member is identical to said first member.

5. The panel and connector combination of claim 1 wherein said extending elements extend in a direction perpendicular to said first member base and second member base, respectively.

6. The panel and connector combination of claim 1 wherein said first and second members are made of a material consisting of wood, metal, concrete, paper, rubber, or other fibrous composites.

7. The panel and connector combination of claim 1 wherein said first member base and second member base extend in a single direction away from said extending elements to form a dual corner connection.

8. The panel and connector combination of claim 7 wherein said single direction is perpendicular to said extending elements of said members.

9. A panel and connector combination with the connectors flexibly forming a reusable joint to support two panels, comprising:

first and second panels, each of said panels having an edge, a first connecting member having a first member base and a plurality of substantially parallel extending elements projecting from said first member base and a second member having a second member base and a single extending element projecting from said second member base; each of said extending elements of the first member being substantially similar to said single extending element of said second member, each of said extending elements of said members having sidewalls which define an upper portion proximal to said base and a lower portion distal from said base, said upper portion being narrower than said lower portion and separated by flange portions formed at an angle of greater than 90 degrees from said sidewalls, said extending elements of said first member being spaced apart such that said sidewalls of each adjacent extending element define a cavity portion substantially similar in configuration to said single extending element, said single extending element of said second member being capable of slidable and removable insertion into the cavity portion of said first member along a common plane formed by said extending elements, such that when said joint is formed, said edges of said panels are supported by said connecting members.

10. The panel and connector combination of claim 9 wherein each of said extending elements of said first member are identical to said single extending element of said second member.

11. The panel and connector combination of claim 9 wherein each cavity has dimensions identical to each extending element such that when said joint is formed, there is no clearance between said extending elements of said first and second members, thereby forming a leak-resistant seal.

12. The panel and connector combination of claim 9 wherein said extending elements of said members extend in a direction perpendicular to said bases.

13. The panel and connector combination of claim 9 wherein said first and second members are made of a material consisting of wood, metal, concrete, paper, rubber, or other fibrous composites.

14. The panel and connector combination of claim 9 wherein said first member base and second member base extend in a single direction away from said extending elements of said members to form a dual corner connection.

15. The panel and connector combination of claim 14 wherein said single direction is perpendicular to said extending elements of said members.

* * * * *